(12) United States Patent
Schulz et al.

(10) Patent No.: US 11,314,123 B2
(45) Date of Patent: Apr. 26, 2022

(54) COMPOSITE PANE HAVING A FUNCTIONAL ELEMENT AND ILLUMINATION

(71) Applicant: SAINT-GOBAIN GLASS FRANCE, Courbevoie (FR)

(72) Inventors: Valentin Schulz, Niederzier (DE); Marcel Klein, Baesweiler (DE); Sebastian Schurse, Übach-Palenberg (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/978,503

(22) PCT Filed: Feb. 1, 2019

(86) PCT No.: PCT/EP2019/052475
§ 371 (c)(1),
(2) Date: Sep. 4, 2020

(87) PCT Pub. No.: WO2019/170330
PCT Pub. Date: Sep. 12, 2019

(65) Prior Publication Data
US 2020/0400997 A1    Dec. 24, 2020

(30) Foreign Application Priority Data

Mar. 6, 2018  (EP) .................................... 18160215

(51) Int. Cl.
*F21V 8/00* (2006.01)
*G02F 1/1335* (2006.01)
(Continued)

(52) U.S. Cl.
CPC ....... *G02F 1/133553* (2013.01); *G02B 6/001* (2013.01); *G02F 1/1334* (2013.01); *G02F 1/172* (2013.01)

(58) Field of Classification Search
CPC ......... G02F 1/1334; B60Q 3/208; B60Q 3/62; B32B 17/10541; B32B 17/10036;
(Continued)

(56) References Cited

U.S. PATENT DOCUMENTS

2009/0279004 A1  11/2009  Greenall et al.
2012/0026573 A1   2/2012  Collins et al.
(Continued)

FOREIGN PATENT DOCUMENTS

DE  10 2004 016808 A1  10/2005
EP      0 876 608 B1    4/2002
(Continued)

OTHER PUBLICATIONS

International Search Report as issued in International Patent Application No. PCT/EP2019/052475, dated Apr. 1, 2019.

*Primary Examiner* — Mariam Qureshi
(74) *Attorney, Agent, or Firm* — Pillsbury Winthrop Shaw Pittman LLP

(57) ABSTRACT

A composite pane having electrically controllable optical properties, includes an outer pane, a first intermediate layer, a second intermediate layer, and an inner pane, a functional element having electrically controllable optical properties, which is arranged between the first intermediate layer and the second intermediate layer, and a thermoplastic frame layer, which surrounds the functional element in the manner of a frame, wherein the outer pane and the inner pane are joined to one another via the first intermediate layer, the second intermediate layer, and the thermoplastic frame
(Continued)

Figure 1:
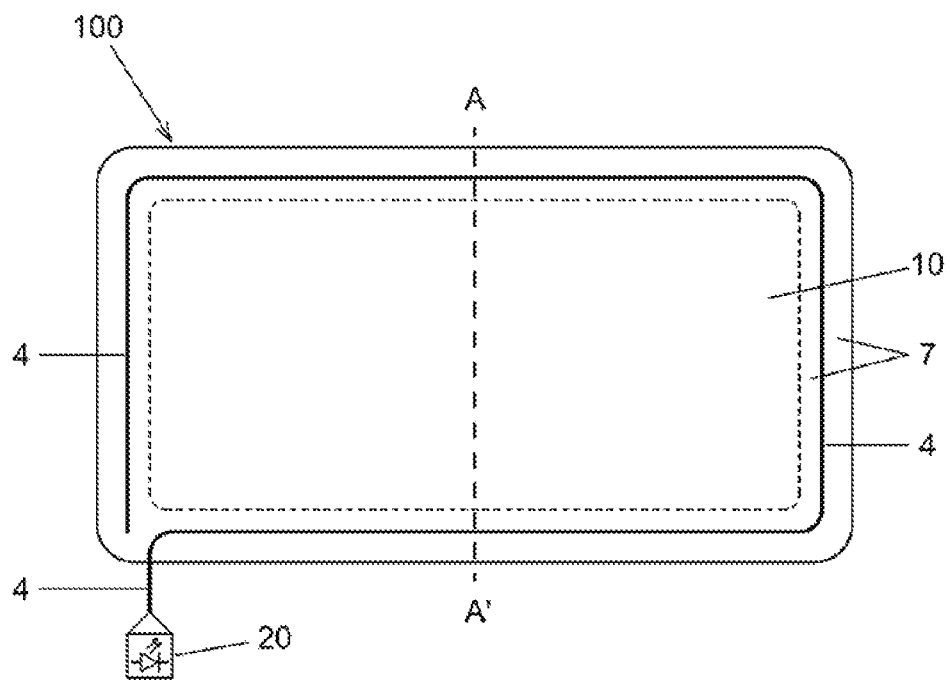

layer, and an optical waveguide is arranged at least partially between the outer pane and the inner pane.

14 Claims, 4 Drawing Sheets

(51) Int. Cl.
*G02F 1/1334* (2006.01)
*G02F 1/17* (2019.01)

(58) Field of Classification Search
CPC ..... B32B 17/10174; B32B 7/023; E06B 9/24; E06B 2009/2464; F21S 41/645; F21S 41/153; F21S 41/255; F21S 41/143
See application file for complete search history.

(56) References Cited

U.S. PATENT DOCUMENTS

| | | | |
|---|---|---|---|
| 2015/0301367 A1* | 10/2015 | Mennig | G02F 1/157 359/245 |
| 2016/0052446 A1* | 2/2016 | Frey | B60Q 1/268 349/16 |
| 2016/0138328 A1* | 5/2016 | Behmke | G02F 1/161 349/16 |
| 2016/0325528 A1 | 11/2016 | Berard et al. | |
| 2018/0170013 A1* | 6/2018 | Hubert | G02F 1/157 |

FOREIGN PATENT DOCUMENTS

| | | | | |
|---|---|---|---|---|
| WO | WO 2007/077099 A1 | 7/2007 | | |
| WO | WO-2007077099 A1 * | 7/2007 | ............. | B60Q 3/208 |
| WO | WO 2011/033313 A1 | 3/2011 | | |
| WO | WO 2012/007334 A1 | 1/2012 | | |

* cited by examiner

COMPOSITE PANE HAVING A FUNCTIONAL ELEMENT AND ILLUMINATION

CROSS-REFERENCE TO RELATED APPLICATIONS

This application is the U.S. National Stage of PCT/EP2019/052475, filed Feb. 1, 2019, which in turn claims priority to European patent application number 18 160 215.2 filed Mar. 6, 2018. The content of these applications are incorporated herein by reference in their entireties.

The invention relates to a composite pane, in particular a composite pane of a vehicle, and a method for its production. The composite pane according to the invention can, for example, be a roof panel of a vehicle.

Composite panes consist of at least one outer pane, one inner pane, and one adhesive intermediate layer that joins the outer pane to the inner pane surface-to-surface. Typical intermediate layers are polyvinyl butyral films, which have, in addition to their adhesive properties, high toughness and high acoustic damping. The intermediate layer prevents disintegration of the composite glass pane in the event of damage. The composite pane merely cracks, but remains dimensionally stable.

Composite panes with electrically switchable optical properties are known from the prior art. Composite panes contain a functional element, which typically contains an active layer between two surface electrodes. The optical properties of the active layer can be changed by a voltage applied on the surface electrodes. Electrochromic functional elements, known, for example, from US 20120026573 A1 and WO 2012007334 A1, are an example of this. SPD functional elements (suspended particle device), known, for example, from EP 0876608 B1 and WO 2011033313 A1, are another example. As a result of the voltage applied, the transmittance of visible light through electrochromic or SPD functional elements can be controlled. Composite panes with such functional elements can, thus, conveniently change their optical properties electrically. Such composite panes have, however, the disadvantage that the composite pane has no illumination at all.

Illumination, in particular contour illumination, can serve as an attractive viewing experience in vehicles. To realize accent or functional illumination in a vehicle, the illumination must be integrated into vehicle parts. Known in the prior art are a large number of individual lighting means that consist of multiple low-power light sources. The installation of light sources inevitably requires a lot of space since, due to their dimensions, they have to be installed as an additional component in the vehicle.

The object of the present invention is to provide an improved composite pane having electrically controllable optical properties and illumination.

The object of the present invention is accomplished according to the invention by a composite pane having electrically controllable optical properties in accordance with claim 1. Preferred embodiments are apparent from the dependent claims.

The composite pane according to the invention having electrically controllable optical properties comprises at least:
- an outer pane, a first intermediate layer, a second intermediate layer, and an inner pane,
- a functional element having electrically controllable optical properties, which is arranged between the first intermediate layer and the second intermediate layer, and
- a thermoplastic frame layer, which surrounds the functional element in the manner of a frame,
wherein the outer pane and the inner pane are joined to one another via the first intermediate layer, the second intermediate layer, and the thermoplastic frame layer; and an optical waveguide is arranged at least partially between the outer pane and the inner pane.

The terms "outer pane" and "inner pane" serve merely to distinguish between a first pane and a second pane. In the case of use of the composite pane as a vehicle pane or as a building pane, the outer pane preferably, but not necessarily, faces the exterior of the composite pane; and the inner pane, the interior.

The composite pane according to the invention is preferably provided in a window opening of a vehicle to separate the interior from the external environment. "Interior" can mean the vehicle interior; and in the context of the invention, "inner pane" refers to the pane of the composite pane facing the interior. "Outer pane" refers to the pane facing the external environment.

The composite pane has, first, a functional element having electrically controllable optical properties that is arranged between the first intermediate layer and the second intermediate layer. A thermoplastic frame layer surrounds the functional element, wherein an optical waveguide is arranged at least partially between the outer pane and the inner pane. During manufacture of the composite pane, the functional element can simply be inserted between the first intermediate layer and the second intermediate layer. The first intermediate layer, the second intermediate layer, and the thermoplastic frame layer contain at least one thermoplastic polymer, for example, ethylene vinyl acetate, polyvinyl butyral, polyurethane, and/or mixtures and/or copolymers thereof. The thickness of the thermoplastic laminating films is preferably from 0.05 mm to 2 mm, for example, 0.38 mm or 0.76 mm. Lamination is done under the influence of heat, vacuum, and/or pressure according to methods known per se.

Through the use of an optical waveguide in the composite pane, the composite pane according to the invention having electrically controllable optical properties has attractive accent lighting.

Along with this, the integration of the optical waveguide into the composite pane results in an enormous saving of space since an additional light module on the composite pane is no longer required.

In an advantageous embodiment, the optical waveguide is arranged between the thermoplastic frame layer and the second intermediate layer. Due to the fact that the optical waveguide is arranged between the thermoplastic frame layer and the second intermediate layer and the thermoplastic frame layer and the second intermediate layer are soft and flexible, the optical waveguide is embedded and fixed between the inner pane and the outer pane during a lamination process. For simpler production of the composite pane, the optical waveguide can be pre-fixed in a surface of the intermediate layer before the lamination process under the influence of pressure and temperature. As a result of this arrangement of the optical waveguide not far from the inner pane, it is clearly discernible in the interior.

In another advantageous embodiment of a composite pane according to the invention, the optical waveguide is joined to the intermediate layer, the outer pane, and/or the inner pane by at least one fastening means. This has the particular advantage that the optical waveguide is fixed in its position during the production of the composite pane and slippage is prevented. The fastening means are preferably transparent such that vision through the composite pane is not or is not substantially impaired.

In another embodiment, the thermoplastic frame layer is dimensioned such that it can accommodate the functional element flush.

In a particularly advantageous embodiment of a composite pane according to the invention, the optical waveguide is at least one optical fiber made of glass and/or plastic. Through the use of optical fibers made of glass and/or plastic to guide light, the light can advantageously be transported to any position of the composite pane with little effort.

The optical waveguide can be implemented at least partially light scattering. The optical waveguide emits light in the direction of an outer side of the composite pane. The optical waveguide can have a tubular sheath that is transparent, at least in sections, or, alternatively, no sheathing. The emission of light can extend over an extended section of the optical waveguide or occur at points.

In addition to the first and second intermediate layer, a third intermediate layer for reflecting infrared radiation can be provided. In this case, the third intermediate layer is arranged between the first intermediate layer and the second intermediate layer.

The third intermediate layer can comprise polyvinyl butyral, ethylene vinyl acetate, polyurethane, and/or mixtures and/or copolymers thereof and a polymer film. Preferably, a layer of polyvinyl butyral (PVB) with a polyethylene terephthalate (PET) film is used. The PET film is particularly advantageous in terms of the stability of the third intermediate layer. The PVB films contain at least one thermoplastic polymer, for example, ethylene vinyl acetate, polyvinyl butyral, polyurethane, and/or mixtures and/or copolymers thereof. The thickness der thermoplastic PVB film is preferably from 0.05 mm to 2 mm, for example, 0.38 mm or 0.76 mm.

The PET film has an infrared-reflecting coating. The infrared-reflecting coating contains silver, titanium dioxide, aluminum nitride, or zinc oxide, with silver preferably used. To improve conductivity with high transparency at the same time, the coating can have multiple electrically conductive layers, which are separated from one another by at least one dielectric layer. The infrared-reflecting and conductive coating can, for example, contain two, three, or four electrically conductive layers. The infrared-reflecting coating can, additionally, have dielectric layers that serve, for example, for regulating you don't like him okay will probably spend sheet resistance, for corrosion protection, or for reducing reflection. Such an infrared-reflecting coating is preferably applied on a surface facing the first intermediate layer.

In a particularly advantageous embodiment of a composite pane according to the invention, the functional element is a PDLC functional element (polymer dispersed liquid crystal). The PDLC functional element has an active layer that contains randomly oriented liquid crystals. This results in strong scattering of the light passing through the active layer. Furthermore, the PDLC functional element has two surface electrodes. When an electrical voltage is applied on the surface electrodes, the liquid crystals align themselves in one direction and the transmittance of light through the active layer is substantially increased. Without electrical voltage applied, the PDLC functional element is characterized by a white, milky appearance that serves as a privacy screen.

In an alternative advantageous embodiment of the invention, the functional element is an SPD functional element (suspended particle device). Here, the active layer contains suspended particles that are preferably embedded in a viscous matrix. The absorption of light by the active layer can be varied by applying a voltage to the surface electrodes, yielding a change in orientation of the suspended particles.

Advantageously, the functional element is arranged centrally in the composite pane. The functional element can be actuated electrically via contact elements.

The panes preferably contain glass, particularly preferably flat glass, float glass, quartz glass, borosilicate glass, soda lime glass, or clear plastics, particularly preferably clear plastics, for example, polycarbonate or polymethyl methacrylate. The panes can be clear and transparent or also tinted or colored. The thickness of the panes can vary widely and thus be adapted to the requirements of the individual case. The thickness of each pane is preferably from 0.5 mm to 15 mm, particularly preferably from 1 mm to 5 mm. The composite pane can have any three-dimensional shape. The composite pane is preferably planar or slightly or sharply curved in one or more spatial directions.

It is understood that a composite pane can have one or a plurality of optical waveguides. Preferably, all optical waveguides are jointly coupled to one lighting means, or each optical waveguide is individually coupled to a lighting means. The optical waveguide(s) can be arranged in the composite pane in any technically possible shape, for example, in the edge region, in the center, in a straight line, curved, or as lettering or symbol.

A further aspect of the invention is a composite pane assembly at least comprising:
  a composite pane according to the invention having electrically controllable optical properties and
  a lighting means for coupling light into the optical waveguide.

The light from the lighting means is coupled into the optical fiber and transmitted or emitted to the outside. For this, the optical waveguide has a first end coupled to the lighting means, a second end, and a side surface extending between the first end and the second end. The side surface serves at least partially for radial emission of light.

The use of a lighting means for coupling light into the optical waveguide of the composite pane has the advantage that the lighting means can be arranged at any position. Thus, the outer design of the composite pane does not depend on the lighting means. The lighting means can be arranged at one of the edges of the composite pane.

The lighting means can be colored or white. The lighting means can also emit light in the ultraviolet range if the optical fiber or its surroundings can convert the ultraviolet light into visible light. Preferred light colors are red (due to the pronounced signal effect), green (due to the high sensitivity of the human eye to the green color spectrum), and blue (due to its particularly aesthetic and low dazzling effect).

Advantageously, the lighting means includes a light source, in particular a laser diode. The use of a laser diode has the advantage that it is particularly high powered and efficient. Thus, an illumination accent can be placed at multiple points of the composite pane. In the case that the functional element is framed by the optical waveguide, complete illumination of the functional element is possible.

The invention also includes a method for producing a composite pane according to the invention having electrically controllable optical properties, wherein at least a) an outer pane, a first intermediate layer, a functional element having electrically controllable optical properties, a thermoplastic frame layer, which surrounds the functional element in the manner of a frame, a second intermediate layer, and an inner pane arranged one above another in this order, and an optical waveguide, which is at least partially embedded between the outer pane and the inner pane, b) the outer pane and the inner pane are joined by lamination, wherein a composite with an embedded functional element and optical waveguide is formed from the first intermediate layer, the second intermediate layer, and the frame layer.

The electrical contacting of the surface electrodes of the functional element is preferably done before lamination of the composite pane.

Any prints that are present, for example, opaque masking prints or printed bus bars for the electrical contacting of the functional element are preferably applied by screen printing.

The lamination is preferably done under the influence of heat, vacuum, and/or pressure. The following methods of lamination can be used: autoclave methods, vacuum laminators, or combinations thereof.

In addition, in step a), a third intermediate layer for reflecting infrared radiation can be provided. In this case, the third intermediate layer is arranged between the first intermediate layer and the second intermediate layer. The third intermediate layer can be implemented as a so-called "bilayer". The bilayer then comprises polyvinyl butyral, ethylene vinyl acetate, polyurethane, and/or mixtures and/or copolymers thereof and a polymer film. Preferably, a layer of polyvinyl butyral (PVB) with a polyethylene terephthalate film (PET) is used. The PET film has an infrared-reflecting coating. Preferably, the PET film and the PVB film are each unwound from a roll, joined to form a bilayer, and the bilayer is rewound onto a roll. For producing the bilayer, the PET film and PVB film in rolled form are unrolled, heated, for example, by passing through a furnace, and then pressed together by a press or a pair of rollers. In one embodiment, the PET films and the PVB film are unrolled in a continuous process, placed one atop another, and joined by a heated pair of rollers. The pressing action of the rollers and the heat transfer to the films during passage through the rollers suffice to obtain adequate adhesion of the films. The bilayer itself can then also be returned to roll form, thus facilitating storage and transport.

In step a), the bilayer is preferably arranged between the first intermediate layer and the thermoplastic frame layer.

The use of a bilayer enables a virtually wrinkle free layering in the composite pane, even with complexly curved pane geometry.

The invention also includes the use of an optical waveguide in a composite pane with a functional element having electrically controllable optical properties or a composite pane assembly, wherein illumination of the composite pane is realized by the optical waveguide.

A further aspect of the invention includes the use of the composite pane or of the composite pane assembly in means of transportation for travel on land, in the air, or on water, in particular in trains, watercraft, and motor vehicles, for example, as a windshield, rear window, side window, and/or roof panel, in buildings, in particular in the access area, window area, roof area, or the facade area, as a built-in part in furniture and appliances.

It is understood that the features mentioned above and explained in detail in the following can be used not only in the combinations and configurations indicated, but also in other combinations and configurations, or in isolation, without departing from the scope of the present invention.

The invention is explained in detail with reference to drawings and exemplary embodiments. The drawings are a schematic representation and not to scale. The drawings in no way restrict the invention.

Figure 2:
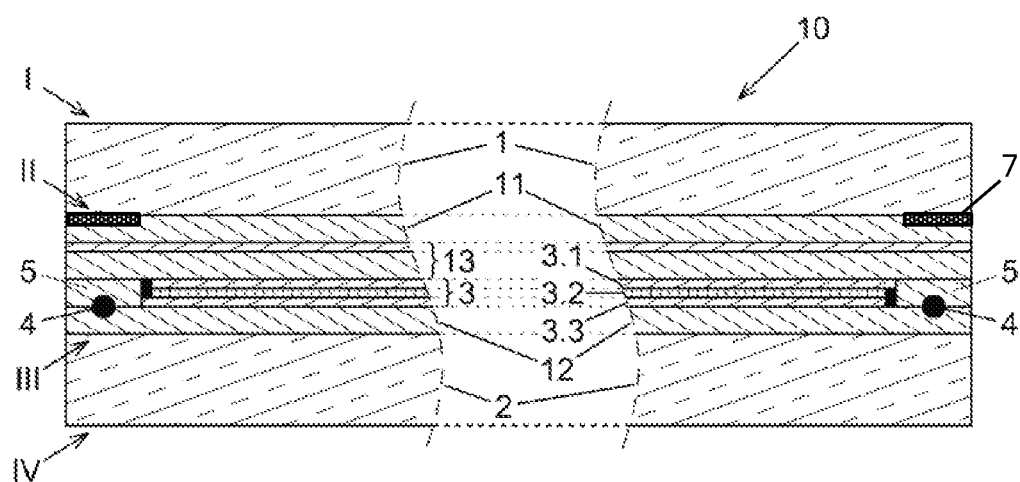
Figure 3:
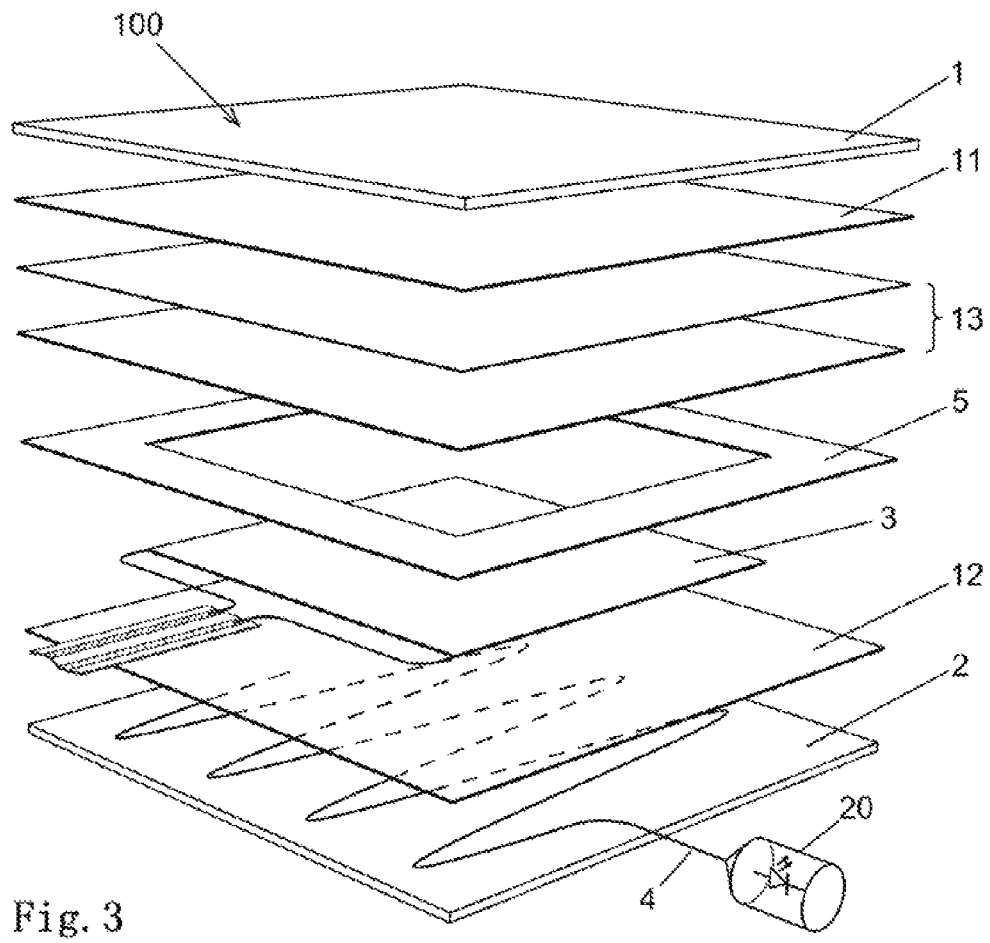
Figure 4:
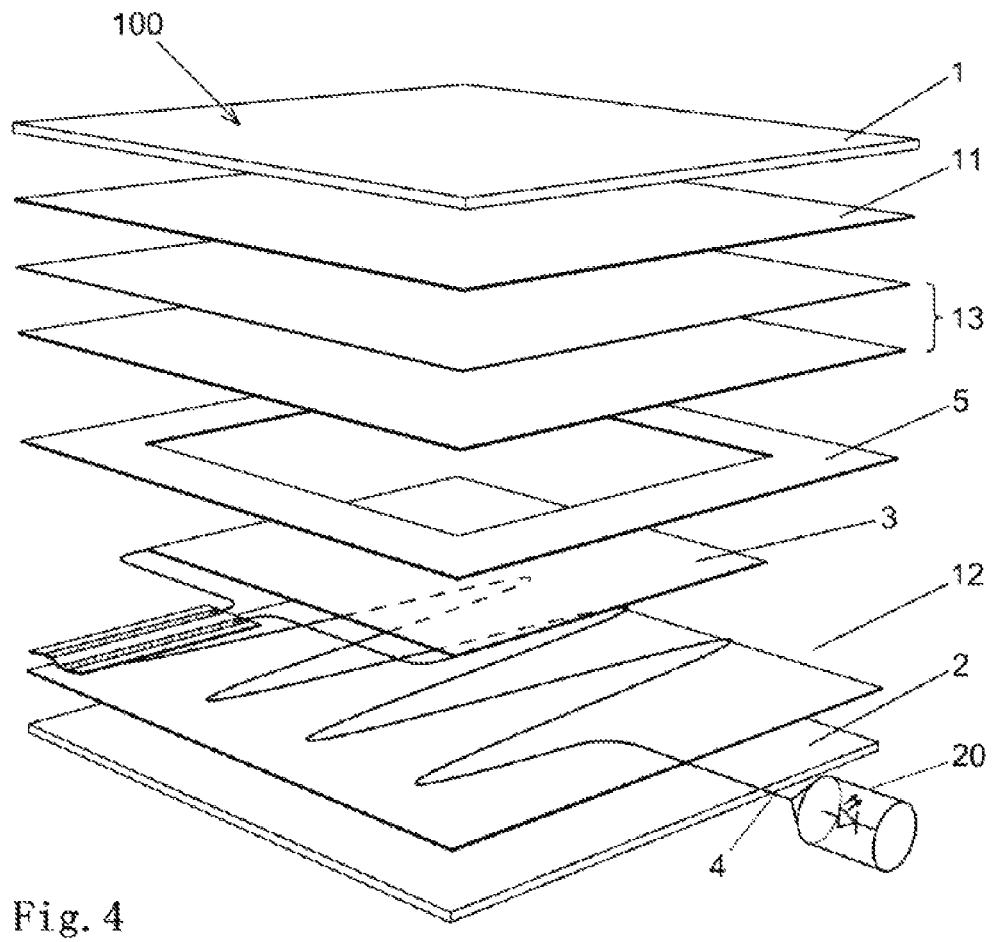
Figure 5:
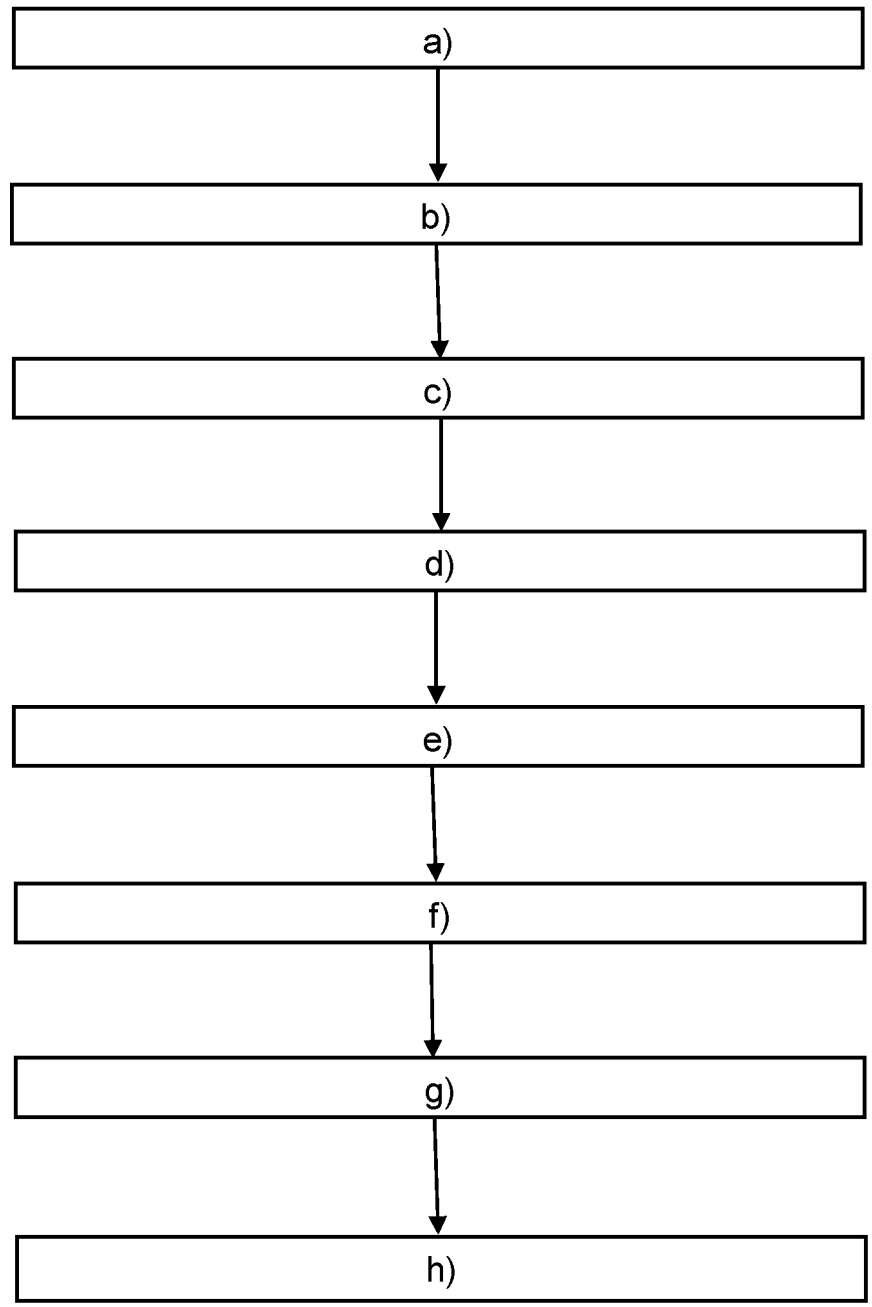

They depict:

FIG. 1 a plan view of an embodiment of the composite pane assembly according to the invention, FIG. 2 a cross-sectional representation along the section line A-A through the composite pane of FIG. 1, FIG. 3 a schematic view of a pane composition per the method according to the invention, FIG. 4 a schematic view of an alternative pane composition per the method according to the invention, and FIG. 5 a flowchart of an embodiment of the method according to the invention.

FIG. 1 depicts a plan view of a composite pane assembly 100 according to the invention, which includes a composite pane 10 according to the invention and a lighting means 20. FIG. 2 depicts a cross-sectional representation along the section line A-A' through the composite pane 10 of FIG. 1. The composite pane 10 is is implemented in this example as a roof panel of a passenger car.

The composite pane 10 according to the invention contains an outer pane 1 with an inner-side surface II, an inner pane 2 with an outer-side surface III, and a first intermediate layer 11, a second intermediate layer 12, a third intermediate layer 13, and a thermoplastic frame layer 5. The first intermediate layer 11 joins the inner-side surface II of the outer pane 1 to the third intermediate layer 13. The third intermediate layer 13, in turn, joins the first intermediate layer 11 to the thermoplastic frame layer 5. The thermoplastic frame layer 5 is joined to the outer-side surface III of the inner pane 2 via the second intermediate layer 12.

The outer pane 1 and the inner pane 2 are made, for example, of soda lime glass and have, for example, a thickness of 2.1 mm in each case. The first intermediate layer 11, the second intermediate layer 12, the third intermediate layer 13, and the thermoplastic frame layer 5 are, in each case, for example, films made of polyvinyl butyral (PVB) with a thickness of 0.38 mm. it is understood that other glass panes or polymer panes can also be used as the outer pane 1 and the inner pane 2. Furthermore, the thickness of the outer pane 1 and the inner pane 2 can be adapted to the respective use.

In this exemplary embodiment, a light-scattering optical waveguide 4 is arranged between the thermoplastic frame layer 5 and the second intermediate layer 12. It is understood that the optical waveguide 4 can also be arranged between the second intermediate layer 12 and the outer-side surface III of the inner pane 2.

The composite pane 10 is equipped with a functional element 3 in the central region of the composite pane 10. The functional element 3 is a PDLC functional element that is embedded in the thermoplastic frame layer, flush on all sides. The thermoplastic frame layer thus forms a universal frame for the functional element 3, which is encapsulated all around in thermoplastic material. The functional element 3 is a multilayer film, consisting of an active layer 3.2 between a first carrier film 3.1 with an electrically conductive coating functioning as surface electrodes and a second carrier film 3.3 with an electrically conductive coating functioning as a surface electrode. The active layer 3.2 contains a polymer matrix with liquid crystals dispersed therein that orient themselves as a function of the electrical voltage applied at the surface electrodes. In this manner, the optical properties of the functional module 3 can be controlled. The first and second carrier film 3.1 and 3.3 are made of PET and have a thickness of, for example, 50 μm. The electrically conductive coating of the first carrier film 3.1 or of the second carrier film 3.3 faces the active layer 3.2. The electrically conductive coatings are made, for example, of ITO with a thickness in the nanometer range. The electrically conductive coatings can, in each case, be electrically connected via bus bars and connecting cables (e.g., "flat connectors") to a supply voltage. The side edges of the functional element are provided at least partially with an edge seal implemented by means of a transparent acrylic adhesive tape. Diffusion into or out of the active layer 3.2 is thus prevented. Since the edge seal is transparent, the side edges of the functional module are not distractingly conspicuous. Since diffusion of plasticizers into the active layer 3.2 is prevented by the edge seal, aging of the functional element 5 can be significantly reduced.

Alternatively, further intermediate layers (not shown here) can also be arranged between the outer pane 1 and the inner pane 2, wherein the optical waveguide 4 is arranged between the two panes 1 and 2.

During production of the composite pane 10, the outer pane 1 is bonded to the inner pane 2 via the intermediate layers 2 by lamination. The outer pane 1 and the inner pane 2 are very rigid and inflexible at the temperatures and pressures customary for this. The first, second, and third intermediate layer 11, 12, 13 as well as the thermoplastic frame layer are then plastic such that the optical waveguide 4 can penetrate into the surface of the second intermediate layer 12 and is embedded there.

The light-scattering optical waveguide 4 has a diameter d of 90 μm in each case and is suitable for emitting light via its sidewall along its extension length. The light is coupled via one end of the optical waveguide 4 into the optical waveguide 4. For this, a lighting means 20 is arranged at one end each of the optical waveguide 4. The lighting means 20 consists, for example, of a laser diode, which can, for example, couple light into the optical waveguide 4 via a reflector. Upon application of a voltage to the laser diode, light is then coupled into the optical waveguide 4. The optical waveguide 4 then scatters the light on its surface along its entire extension length such that the optical waveguide 4 lights up over its entire extension length.

In this example, the composite pane 10 has, on a circumferential edge region of the inner-side surface II of the outer pane 1, an opaque masking print 7, for example, a black print of a ceramic ink, which forms a permanent bond with the glass surface III of the inner pane 2, by firing. The purpose of the masking print 7 is to block through-vision to the gluing points with which the composite pane 10 is glued into a vehicle body. At the same time, the gluing point is protected against light irradiation and, in particular, against radiation by UV light, which would cause accelerated aging of the gluing point.

The optical waveguide 4 is, in this example, arranged in the form of a frame in the edge region of the composite pane 10. Here, for example, the optical waveguide 4 is arranged in a region that is concealed by the inner-side surface II of the outer pane 2 by the masking print 7. This means that the optical waveguide 4 can be seen from the vehicle interior. In particular, light emitted on the side walls of the optical waveguide also reaches the vehicle interior.

Here, the lighting means 20 is, for example, a high-powered laser diode. The composite pane assembly 100 produced with this composite pane 10 is, for example, configured such that the lighting means 20 lights up the optical waveguide 4. This can occur independent of or simultaneously with the rest of the vehicle lighting.

The lighting means 20 can be monochromatic or or set different accents by various colors. Different colors allow making attractive illumination of the vehicle readily visible.

It is understood that the optical waveguide 4 need not be arranged along one side edge of a pane or only along one side of a pane, but can be arranged in any manner desired. In particular, one or a plurality of optical waveguide 4 can be arranged like a wave, e.g., in the shape of a sine wave.

It is further understood that the optical waveguide 4 can have regions in which light exits via the sidewalls of the optical waveguide 4 such that symbols not connected to one another can be illuminated. The aesthetics of the composite pane 10 are thus significantly more attractively designed.

FIG. 3 depicts the composition of the composite glass arrangement 100 according to the invention produced per the method according to the invention. A wavelike optical waveguide 4 is arranged flat on the inner pane 2, depicted here as the lower base pane. The optical waveguide 4 is covered by the second intermediate layer 12, on which the functional element 3 having the thermoplastic frame layer 5 is arranged. The third intermediate layer 13 is placed on the functional element 3 having the thermoplastic frame layer 5. The third intermediate layer 13 contains the bilayer consisting of a PVB film and a PET film. In the preferred embodiment, the PET film has an infrared reflecting coating. The first intermediate layer 11 is arranged flat on the third intermediate layer 11 and covered by the outer pane 1.

FIG. 4 depicts a composition of another embodiment of the composite pane assembly 100 according to the invention. The composite pane assembly 100 corresponds substantially to the embodiment of FIG. 3. The wavelike optical waveguide 4 is, however, arranged between the second intermediate layer 12 and the functional element 3 having the thermoplastic frame layer 5.

FIG. 5 depicts an exemplary embodiment of the production method according to the invention with reference to a flowchart. The method according to the invention comprises, for example, the following steps:

a) Providing an outer pane 1 b) Placing a first intermediate layer 11 on the outer pane 1 c) Placing a third intermediate layer 13 on the first intermediate layer 11, wherein the third intermediate layer 13 is provided with an infrared-reflecting coating d) Placing a thermoplastic frame layer 5 on the third intermediate layer 13, wherein the thermoplastic frame layer 5 is provided to accommodate a functional element 3 e) Inserting the functional element precisely 3 into the thermoplastic frame layer 5, which is a PDLC functional element f) Placing a second intermediate layer 12 on the functional element 3 and the thermoplastic frame layer 5 and the PDLC functional element 3 g) Placing an inner pane 2 on the second intermediate layer 12 h) Laminating the stack in a bonding process, e.g., autoclaving.

LIST OF REFERENCE CHARACTERS

1 outer pane
2 inner pane
3 PDLC functional element
3.1 first carrier film with an electrically conductive coating 3.2 active layer of the PDLC functional element
3.3 second carrier film with an electrically conductive coating
4 optical waveguide
5 thermoplastic frame layer
7 opaque masking print
10 composite pane
11 first intermediate layer
12 second intermediate layer
13 third intermediate layer
20 lighting means
100 composite pane assembly
A-A' section line
I outer-side surface of the outer pane 1
II inner-side surface of the outer pane 1
III outer-side surface of the inner pane 2
IV inner-side surface of the inner pane 2

The invention claimed is:

1. A composite pane having electrically controllable optical properties, comprising:
   an outer pane, a first intermediate layer, a second intermediate layer, and an inner pane,
   a functional element having electrically controllable optical properties, which is arranged between the first intermediate layer and the second intermediate layer, and
   a thermoplastic frame layer, which surrounds the functional element in the manner of a frame, wherein the thermoplastic frame layer has a through-hole that receives the functional element and is dimensioned such that the thermoplastic frame layer accommodates the functional element flush like a universal frame so that an upper and a lower surface of the thermoplastic frame layer are flush with, respectively, an upper and a lower surface of the functional element,
   an opaque masking print on a circumferential edge region of an inner-side surface of the outer pane, the inner-side surface of the outer pane being oriented towards the inner pane, wherein the outer pane and the inner pane are bonded to one another via the first intermediate layer, the second intermediate layer, and the thermoplastic frame layer; and
   an optical waveguide is arranged at least partially between the outer pane and the inner pane,
   wherein the optical waveguide comprises at least one optical fiber made of glass and/or plastic,
   wherein the optical waveguide is at least partially light scattering,
   wherein the optical waveguide is arranged between the second intermediate layer and the inner pane, and wherein the optical waveguide is in direct contact with both the second intermediate layer and the inner pane.

2. The composite pane according to claim 1, wherein a third intermediate layer is provided for reflecting infrared radiation.

3. The composite pane according to claim 2, wherein the third intermediate layer is arranged between the first intermediate layer and the second intermediate layer.

4. The composite pane according to claim 2, wherein the third intermediate layer comprises polyvinyl butyral, ethylene vinyl acetate, polyurethane, and/or mixtures and/or copolymers thereof and a polymer film.

5. The composite pane according to claim 4, wherein the polymer film has an infrared-reflecting coating.

6. The composite pane according to claim 1, wherein the functional element is a PDLC functional element.

7. The composite pane according to claim 1, wherein the functional element is arranged centrally in the composite pane.

8. The composite pane according to claim 1, wherein the functional element includes contact elements for electrical control.

9. A composite pane assembly, comprising:
   a composite pane according to claim 1, and
   a lighting system configured to couple light into an optical waveguide.

10. The composite pane assembly according to claim 9, wherein the lighting system includes a light source.

11. The composite pane assembly according to claim 10, wherein the light source is a laser diode.

12. A method for producing a composite pane having electrically controllable optical properties according to claim 1, comprising:
   a) arranging an outer pane, a first intermediate layer, a functional element having electrically controllable optical properties, a thermoplastic frame layer, which surrounds the functional element in the manner of a frame, a second intermediate layer, and an inner pane above one another in this order; and arranging an optical waveguide at least partially between the outer pane and the inner pane,
   b) joining the outer pane and the inner pane by lamination, wherein a composite with an embedded functional element and optical waveguide is formed from the first intermediate layer, the second intermediate layer, and the thermoplastic frame layer.

13. A method comprising utilizing an optical waveguide in a composite pane with a functional element having electrically controllable optical properties according to claim 1, wherein illumination is realized by the optical waveguide.

14. A method comprising utilizing an optical waveguide in a composite pane assembly according to claim 9, wherein illumination is realized by the optical waveguide.

* * * * *